United States Patent [19]

Ichikawa et al.

[11] Patent Number: 4,539,139

[45] Date of Patent: Sep. 3, 1985

[54] PROCESS FOR THE PREPARATION OF OIL-IN-WATER EMULSIONS

[75] Inventors: Yasunori Ichikawa; Shigeru Yamaguchi; Akira Kojima; Kazuhiko Fujiwara, all of Kanagawa, Japan

[73] Assignee: Fuji Photo Film Co., Ltd., Kanagawa, Japan

[21] Appl. No.: 607,473

[22] Filed: May 7, 1984

[30] Foreign Application Priority Data

May 6, 1983 [JP] Japan ................................. 58-79105

[51] Int. Cl.³ ............................................. B01J 13/00
[52] U.S. Cl. ................................... 252/314; 252/312; 366/168; 430/377
[58] Field of Search .................. 252/312, 314, 359 C, 252/359 R; 366/168; 430/377

[56] References Cited

U.S. PATENT DOCUMENTS 328,585 10/1885 Hornbostel ......................... 366/168
4,349,455 9/1982 Yamamura et al. ............. 252/314 X

FOREIGN PATENT DOCUMENTS 1139318 11/1962 Fed. Rep. of Germany ...... 366/168

OTHER PUBLICATIONS

Weiser: *A Textbook of Colloid Chemistry*, Second Edition, John Wiley & Sons, Inc., New York, 1949, pp. 343 and 344.

*Primary Examiner*—Richard D. Lovering
*Attorney, Agent, or Firm*—Sughrue, Mion, Zinn, Macpeak & Seas

[57] ABSTRACT

A process for preparing an oil-in-water emulsion is described, comprising the steps of: adding a mixture of a hydrophobic substance and an emulsifying agent directly or after being dissolved in an organic solvent by heating in a dissolving-emulsifying tank with a high-speed agitation type dispersing means to form a hydrophobic substance solution as an oil phase, introducing water and/or an aqueous solution of gelatin into the tank through submerged inlet under the hydrophobic substance solution to form a water-in-oil emulsion, and further continuing the addition of water and/or an aqueous solution of gelatin to cause the phase inversion, whereupon the desired oil-in-water emulsion is formed. The mean particle size of the emulsion is decreased more than by the conventional emulsification method, and the particle size distribution is narrowed and made sharp.

4 Claims, 6 Drawing Figures

PROCESS FOR THE PREPARATION OF OIL-IN-WATER EMULSIONS

FIELD OF THE INVENTION

The present invention relates to a process for preparing oil-in-water emulsions of hydrophobic substances.

BACKGROUND OF THE INVENTION

Various techniques have been developed for the preparation of oil-in-water emulsions. One method titling "Emulsification Method" is proposed in U.S. Pat. No. 4,349,455.

Referring to FIG. 1, there is shown a cross section of an apparatus for use in the practice of the method of emulsification as described in U.S. Pat. No. 4,349,455. In a dissolving-emulsifying tank 2 equipped with a high-speed rotor 1, a hydrophobic substance or a mixture of a hydrophobic substance and an emulsifying agent is added directly or after being dissolved in an organic solvent by heating to form a hydrophobic substance solution as an oil phase. Then, into the tank 2 through a conduit 3 is introduced water singly or in combination with an emulsifying agent while stirring to form a water-in-oil emulsion. Addition of water or a mixture of water and the emulsifying agent is continued until the phase inversion occurs, whereupon an oil-in-water emulsion is formed. Thereafter, a water-soluble binder is added to the above prepared oil-in-water emulsion to form the desired oil-in-water emulsion.

The present invention is directed to improvements in the method of emulsification as described above. Thus, it offers various advantages: for example, the dispersion efficiency is improved, the mean particle size is further decreased, the particle size distribution is narrowed and made sharp, and the emulsification can be performed in a short period of time.

SUMMARY OF THE INVENTION

The present invention relates to a process for preparing an oil-in-water emulsion which comprises the steps of:

adding a mixture of a hydrophobic substance and an emulsifying agent directly or after being dissolved in an organic solvent by heating in a closed dissolving-emulsifying tank equipped with a high-speed dispersing means to form a hydrophobic substance solution as an oil phase, introducing water and/or an aqueous solution of gelatin into the hydrophobic substance solution through submerged inlet and stirring the resulting mixture to form a water-in-oil emulsion, and further continuing the addition of water and/or an aqueous solution of gelatin to cause the phase inversion, whereupon the desired oil-in-water emulsion is formed.

DETAILED DESCRIPTION OF THE INVENTION

The present invention will hereinafter be explained with reference to the accompanying drawings.

Figure 2:
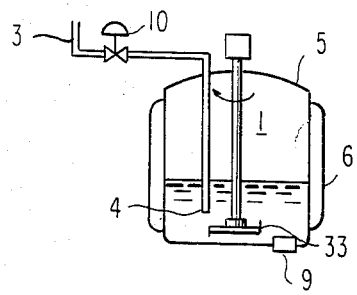
FIGS. 2 and 3 are each a cross-sectional view of apparatus for use in the practice of the method of the present invention.
Figure 3:
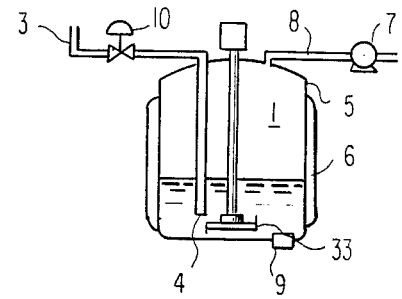

Referring to FIGS. 2 and 3, there are shown the cross sections of apparatus for use in the practice of the method of the invention. In a closed dissolving-emulsifying tank 5 equipped with a high-speed agitation blade 1, a hydrophobic substance and an emulsifying agent are added directly or after being dissolved in an organic solvent by heating to form a solution of the hydrophobic substance as an oil phase. The amount of the hydrophobic substance added is from 1/5 to ⅓ of the weight of the ultimate emulsion. The term "heating" as referred to herein is heating at a temperature lower than the boiling point of the solvent used, preferably 25° C. to 65° C. Then, water and/or an aqueous solution of gelatin is introduced into the solution of hydrophobic substance from an introduction submerged inlet 4 through a conduit 3, and stirred to form a water-in-oil emulsion. The addition of water and/or an aqueous solution of gelatin is continued until the phase inversion occurs, whereupon an oil-in-water emulsion is formed. The tank 5 is provided with a jacket 6 through which hot water is circulated to maintain the contents of the tank 5 at a constant temperature. In the tank 5 of FIG. 3, a pressure-reduced state can be produced by evacuating the air through an exhaust pipe 8 by means of a vacuum pump 7.

Figure 4:
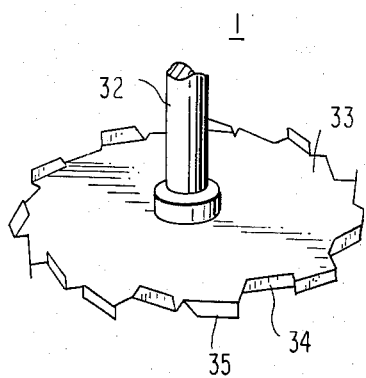
FIGS. 4 and 5 are each an enlarged perspective view of a high-speed agitation blade used in the apparatus of FIGS. 2 and 3, respectively.

As the high-speed rotation blade 1, a dissolver of the shape shown in FIG. 4, which is disclosed in U.S. Pat. No. 4,349,455, can be used. In addition, an agitation blade of the shape shown in FIG. 5 can be used. The high-speed rotation blade 1 of FIG. 4 comprises a vertical shaft 32 rotating at a high speed in the center of the tank substantially circular in cross section and an impeller 33 with saw-shaped blades 34 and 35. The apparatus is preferably designed so that with the diameter of the impeller 33 as D, the inner diameter of the tank 5 is 2.0 D to 4.0 D, the clearance between the bottom of the tank 5 and the impeller 33 is 0.5 D to 1.0 D, and the depth of a stationary liquid in the tank 5 is 1.0 D to 3.0 D.

Figure 5:
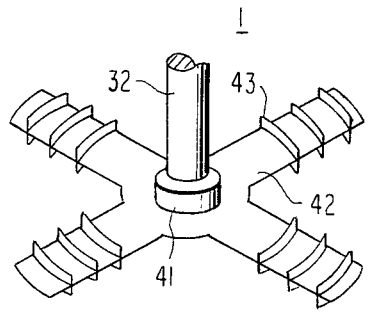

The high-speed dispersing means and the above described dissolver may be any conventional dispersing means, such as a homomixer, a homoblender, and a Kady mill, in which a dispersing action is exerted mainly in the liquid and which rotate at a high speed (500 to 15,000 rpm, preferably 2,000 to 4,000 rpm). For example, a rotation impeller 41 as shown in FIG. 5, in which a plurality of fins 43 are provided onto both surfaces of a blade 42, which is not twisted and flat, in the axial direction, can be used. If desired, a plurality of high-speed rotation blades can be provided in the tank 5, or in combination with the high-speed rotation blade, the usual agitator or emulsifying means, such as a paddle type of agitator, a propeller type of agitator, and a colloid mill, can be used.

In the apparatus of FIGS. 2 and 3, the introduction submerged inlet 4 is preferable located at a position of 0.01 D to 0.5 D, above the agitation impeller 33. More preferably, the introduction inlet 4 is located at a position of 0.05 D to 0.2 D above the agitation impeller 33, or at a position adjacent to the agitation impeller 33, so that the feed material can be introduced toward the agitation impeller 33 or 41. This is one of the conditions required in the practice of the invention.

The tank 5 of the apparatus shown in FIGS. 2 or 3 is provided with an electric conductivity meter 9, the detector of which is placed inside the tank 5. This conductivity meter 9 is used to detect the start of the phase inversion when water and/or an aqueous solution of gelatin is introduced into the solution of the hydrophobic substance as an oil phase in the tank 5. Immediately after the electric conductivity meter 9 detects the start of phase inversion, a valve 10 is closed to interrupt the introduction of the water and/or aqueous solution of gelatin. Even if the introduction is interrupted, the phase inversion proceeds smoothly and is completed shortly. By continuing the agitation after the completion of the phase inversion, the mean grain size can be further reduced and, furthermore, the grain size distribution can be narrowed and made sharp.

As the electric conductivity meter 9, the commonly used electrode-opened meter can be used. In the practice of the invention, however, it is preferred to use a meter of the type that is incorporated in the tank 5 with the clearance between electrodes molded. The electrical conductivity of the liquid changes extremely as the phase inversion from a water-in-oil emulsion to an oil-in-water emulsion occurs. At this point, the addition of the water and/or aqueous solution of gelatin is interrupted. This interruption is another condition required for the present invention.

The term "oil-in-water emulsion" as used herein means those emulsions used in photographic light-sensitive material, pressure-sensitive paper, etc., as well as those emulsions widely used in cosmetics, foodstuffs, paints, medicines, etc. The hydrophobic substance is an effective ingredient in such products. In the preparation of photographic light-sensitive material, for example, hydrophobic substances are used as dye image-forming compounds (hereinafter referred to as "couplers"), diffusion transfer compounds, anti-color-foggants, anti-fading agents, color mixing-preventing agents, ultraviolet ray absorbers, whitening agents, etc. If the hydrophobic substance is liquid, it is used as such, or if desired, in combination with an organic solvent, an emulsifying agent or an emulsifying agent dissolved in an organic solvent, to prepare an oil phase solution (hereinafter referred to merely as an "oil phase solution"). On the other hand, if the hydrophobic substance is solid, it is heated, or dissolved in an organic solvent, or dissolved in an organic solvent in combination with an emulsifying agent to form the oil phase solution. This oil phase solution is added to an aqueous solution containing a water-soluble binder, if desired in combination with an emulsifying agent and emulsified and dispersed therein to prepare an oil-in-water emulsion having a mean particle size ranging between about 0.1 and 1.0 μm.

The above described couplers are color image-forming compounds forming dyes on reacting with oxidized products of color developing agents, such as aromatic amines (usually primary amines). It is generally preferred to use compounds which contain a hydrophobic group called a "ballast group" in the molecule and which are non-diffusible. They may be either 4-equivalent or 2-equivalent relative to silver ions. These couplers include colored couplers having an effect of color correction and so-called DIR couplers releasing development inhibitors with the progress of development. As yellow couplers of the above described couplers, known closed-chain trimethylene couplers can be used. In particular, benzoylacetanilide and pivaloylacetanilide compounds are advantageously used.

Magenta forming couplers which can be used include pyrazolone, indazolone and cyanoacetyl compounds. In particular, pyrazolone compounds are advantageously used.

As cyan forming couplers, phenol and naphthol compounds, for example, can be used.

As colored couplers, those couplers described in, for example, Japanese Patent Application (OPI) No. 42121/77 can be used (the term "OPI" as used herein means a "published unexamined Japanese patent application"). As DIR couplers, those couplers described in, for example, Japanese Patent Application (OPI) No. 69624/77 can be used. In addition to the above described DIR couplers, compounds releasing development inhibitors with the progress of development may be incorporated in light-sensitive material. For example, the compounds described in Japanese Patent Application (OPI) No. 9116/78 can be used.

The above described diffusion transfer compounds include dye developing agents, diffusible dye-releasing couplers (DDR couplers) and diffusible dye-releasing redox compounds (DRR compounds).

As the above described anti-color-foggants, those containing hydroquinone derivatives, aminophenol derivatives, gallic acid derivatives, and ascorbic acid derivatives can be used.

The above described anti-fading agents include dihydroxybenzene derivatives, dihydroxynaphthalene derivatives, aminonaphthol derivatives, sulfonamidophenol derivatives, and sulfonamidonaphthol derivatives.

The above described ultraviolet ray absorbers include benzotriazole compounds substituted by an aryl group, 4-thiazolidone compounds, benzophenone compounds, cinnamic acid ester compounds, butadiene compounds, and benzoxyzole compounds. In addition, ultraviolet ray-absorbing couplers, ultraviolet ray-absorbing polymers, etc., may be used.

The above described whitening agents include stylbenzene, triazine, oxazole and coumarin compounds.

Organic solvents which can be used, for example, in the preparation of photographic light-sensitive material include high boiling organic solvents such as alkyl phthalates, phosphates, citrates, benzoates, alkylamides, and fatty acid esters, and relatively low boiling organic solvents having a boiling point ranging between about 30° to 160° C., such a lower alkyl acetates, ethyl propionate, sec-butyl alcohol, methyl isobutyl ketone, cyclohexanone, β-ethoxyethyl acetate, and methyl Cellosolve.

Water-soluble binders which can be used, for example, in the preparation of photographic light-sensitive material include proteins such as gelatin, gelatin derivatives, graft polymers of gelatin and other polymers, albumin, and casein; saccharide derivatives such as cellulose derivatives (e.g., hydroxyethyl cellulose, carboxymethyl cellulose, and cellulose sulfate), sodium alginate, and starch derivatives; and synthetic hydrophilic polymers, homopolymers or copolymers, such as polyvinyl alcohol, partial acetal of polyvinyl alcohol, poly-N-vinyl pyrrolidone, polyacrylic acid, polymethacrylic acid, polyacrylamide, polyvinyl imidazole, and polyvinyl pyrazole.

Emulsifying agents which can be used, for example, in the preparation of photographic light-sensitive material include nonionic surfactants such as saponin (steroid-type), alkylene oxide derivatives (e.g., polyethylene glycol, a polyethylene glycol/polypropylene glycol condensate, polyethylene glycol alkyl or alkylaryl ethers, polyethylene glycol esters, polyethylene glycol sorbitan esters, polyalkylene glycol alkylamines or amides, and a silicone/polyethylene oxide adduct), glycidol derivatives (e.g., alkenylsuccinic acid polyglycerides, and alkylphenol polyglycerides), fatty acid esters of polyhydric alcohols, alkyl esters of saccharides, urethanes and ethers; anionic surfactants containing acidic groups, such as a carboxyl group, a sulfo group, a phospho group, a sulfuric acid ester group, and a phosphoric acid ester group, such as triterpenoidsaponin, alkylcarboxylates, alkylsulfonates, alkylbenzenesulfonates, alkylnaphthalenesulfonates, alkylsulfates, alkylphosphates, N-acyl-N-alkyltaurines, sulfosuccinates, sulfoalkyl polyoxyethylene alkylphenyl ethers, and polyoxyethylene alkylphosphates; amphoteric surfactants such as amino acids, aminoalkylsulfonic acids, aminoalkyl sulfates or phosphates, alkylbetaines, amine imides, and amino oxides; and cationic surfactants such as alkylamines, aliphatic or aromatic quaternary ammonium salts, heterocyclic quaternary ammonium salts (e.g., pyridinium and imidazolium), and aliphatic or heterocyclic ring-containing phosphonium or sulfonium salts.

As the above described hydrophobic substance, organic solvent for dissolving the hydrophobic substance, water-soluble binder, and emulsifying agent, as well as the compounds as described above, the compounds described in U.S. Pat. No. 4,349,455 can all be used.

The present invention is described in greater detail with reference to the following examples and comparative examples.

EXAMPLE 1

In the dissolving-emulsifying tank 5 shown in FIG. 2, 20 g of a dispersion of 3-3-[2-(2,4-di-tertamylphenoxy)acetamido]-benzamidoco-1-(2,4,6-trichlorophenyl)-2-pyrazolin-5-one as a magenta forming coupler, 20 ml of tricresyl phosphate, 25 ml of ethyl acetate, and 1 g of sodium dodecylbenzenesulfonate were dissolved by heating at 60° C. to form 60 ml of a coupler solution as an oil phase. Water was introduced in the tank under the coupler solution and stirred to form a water-in-oil emulsion. On continuing the addition of water, the phase inversion occurred, whereupon an oil-in-water emulsion was formed. The start of the phase inversion was detected by means of the electric conductivity meter 9, and just after the start of the phase inversion the control valve 10 was closed to interrupt the addition of water. The amount of water added prior to this interruption was 60 ml, and the addition period was 5 minutes. The number of revolutions of the high-speed rotation blade 1 was 3,000 rpm. Thereafter, at the same number of revolutions as above, agitation was continued for an additional 10 minutes. At the end of the period, the number of revolutions of the high-speed rotation blade 1 was dropped to 500 rpm, and the necessary amounts of water and aqueous gelatin solution were added to stabilize the above prepared oil-in-water emulsion.

For the thus prepared oil-in-water emulsion, the mean particle size was 0.15 μm and the particle size distribution was between 0.05 and 0.30 μm.

COMPARATIVE EXAMPLE 1

Figure 1:
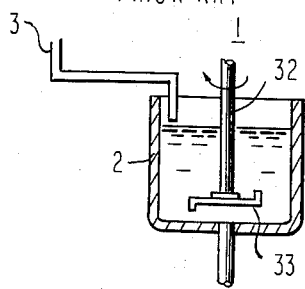
FIG. 1 is a cross-sectional view of an apparatus for use in the practice of a conventional emulsification method as proposed in U.S. Pat. No. 4,349,455.

In the dissolving-emulsifying tank 2 shown in FIG. 1, 20 g of a dispersion of 3-3-[2-(2,4-di-tertamylphenoxy)acetamido]-benzamidoco-1-(2,4,6-trichlorophenyl)-2-pyrazolin-5-one as a magenta forming coupler, 20 ml of tricresyl phosphate, 25 ml of ethyl acetate, and 1 g of sodium dodecylbenzenesulfonate were dissolved by heating at 60° C. to form 60 ml of a coupler solution as an oil phase. While adding 80 ml of water to the coupler solution, the dissolver (high-speed rotation blade) 1 was run for 5 minutes at 1,000 rpm. Thereafter, an aqueous solution of gelatin prepared by dissolving 24 g of gelatin powder in 96 ml of water was introduced thereinto, and the dissolver (high-speed rotation blade) 1 was run for 15 minutes at 1,000 rpm and then for 30 minutes at 3,000 rpm to form an oil-in-water emulsion.

This comparative example was performed in the same manner as in Example 1 of U.S. Pat. No. 4,349,455. The mean particle size was 0.27 μm and the particle size distribution was between 0.05 and 0.6 μm.

EXAMPLE 2

Using the same apparatus as in Example 1, the procedure of Example 1 was repeated except that a 16% by weight aqueous solution of gelatin was used in place of water. A water-in-oil emulsion was first prepared and then the addition of the aqueous solution of gelatin was continued to cause the phase inversion, whereupon an oil-in-water emulsion was formed. The start of the phase inversion was detected by means of the conductivity meter 9, and just after the start of the phase inversion, the control valve 10 was closed to interrupt the introduction of the aqueous solution of gelatin under the liquid. The amount of the aqueous solution of gelatin added until the introduction was interrupted was 45 ml, and the addition period was 5 minutes. The number of revolutions of the high-speed rotation blade 1 was 5,000 rpm. Thereafter, at the same number of revolutions as above, agitation was continued for an additional 10 minutes. At the end of the time, the number of revolutions of the high-speed rotation blade 1 was dropped to 500 rpm, and 77 ml of water and 30 ml of a 16% by weight aqueous solution of gelatin necessary for the preparation of the desired emulsion were added to stabilize the above prepared emulsion.

For the thus prepared oil-in-water emulsion, the mean particle size was 0.25 μm and the particle size distribution was between 0.05 and 0.32 μm.

COMPARATIVE EXAMPLE 2

The procedure of Comparative Example 1 was repeated except that while adding 75 ml of a 16% by weight agueous solution of gelatin, the dissolver 1 was run for 5 minutes at 1,000 rpm. Thereafter, 77 ml of water was added and the dissolver 1 was run for 15 minutes at 1,000 rpm and for 30 minutes at 3,000 rpm to form an oil-in-water emulsion.

This comparative example was also performed in the same manner as in Example 1 of U.S. Pat. No. 4,349,455. The mean particle size was 0.03 μm and the particle size distribution was between 0.05 and 0.50 μm.

Figure 6:
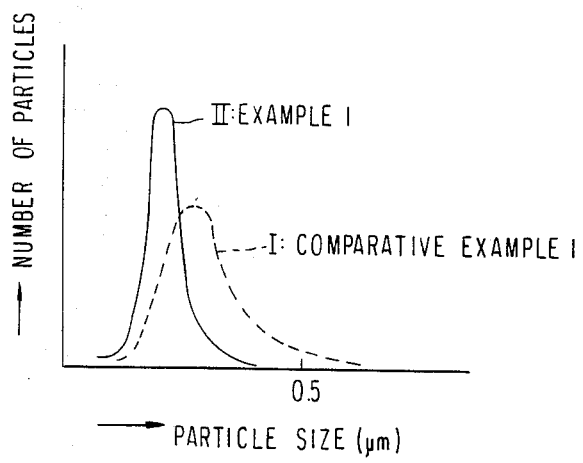
FIG. 6 is a graph showing particle size distribution of emulsions prepared by the conventional method and the method of the invention.

The method of the invention produces various advantages. For example, since water and/or an aqueous solution of gelatin is introduced under the liquid, the mean grain size can be more decreased. Furthermore, since the phase inversion is detected and just after the start of the phase inversion, the introduction of water and/or aqueous solution of gelatin is interrupted, the grain size distribution can be narrowed and made sharp. In FIG. 6, the dotted line (I) indicates the grain size distribution of Comparative Example 1, and the solid line (II), the particle size distribution of Example 1. It can be seen from FIG. 6 that the particle size distribution of Example 1 is narrow and sharp compared with that of Comparative Example 1.

Other advantages include: the emulsification time can be shortened, the amount of the emulsifier to be added can be decreased, the power for driving the stirrer can be reduced, and the scale dependency of the tank can be reduced.

While the invention has been described in detail and with reference to specific embodiments thereof, it will be apparent to one skilled in the art that various changes and modifications can be made therein without departing from the spirit and scope thereof.

We claim:

1. A process for preparing an oil-in-water emulsion which comprises the steps of:

adding a mixture of a hydrophobic substance and an emulsifying agent directedly or after being dissolved in an organic solvent by heating in a dissolving-emulsifying tank equipped with a high-speed agitation type dispersing means, to form a hydrophobic substance solution as an oil phase, introducing water and/or an aqueous solution of gelatin into the tank under the hydrophobic substance solution through a submerged inlet and stirring the resulting mixture to form a water-in-oil emulsion, and detecting a timing of the phase inversion by an electric conductivity meter, and upon detection, interrupting the further addition of the water and/or the aqueous solution of gelatin and, thereafter, again conducting the addition of the water and/or the aqueous solution of gelatin to achieve stabilization of the emulsion.

2. A process as claimed in claim 1, wherein the tank is provided with an impeller having a diameter D and the tank has an inner diameter in the range of 2.0 D to 4.0 D and the clearance between the impeller and the tank bottom is in the range of 0.5 D to 1.0 D.

3. A process as claimed in claim 2, wherein the impeller is capable of being rotated at a speed in the range of 500 to 15,000 rpm.

4. A process as claimed in claim 3, wherein the impeller can be rotated at a speed in the range of 2,000 to 4,000 rpm.

* * * * *